United States Patent [19]
Wollenburg

[11] 3,779,328
[45] Dec. 18, 1973

[54] TRAILER MANEUVERING MECHANISM

[76] Inventor: John G. Wollenburg, 410 Clinton Ave., Oak Park, Ill.

[22] Filed: June 30, 1972

[21] Appl. No.: 268,033

[52] U.S. Cl............ 180/14 A, 180/1 AW, 180/15, 180/19
[51] Int. Cl............................................. B62d 13/06
[58] Field of Search................ 180/15, 1 AW, 11, 180/14 A, 12, 21, 22, 19

[56] References Cited
UNITED STATES PATENTS

| | | | |
|---|---|---|---|
| 3,705,638 | 12/1972 | Shock | 180/11 X |
| 3,690,397 | 9/1972 | Parker | 180/19 R X |
| 2,778,181 | 1/1957 | Gray | 180/15 X |
| 3,439,764 | 4/1969 | Kimball | 180/12 |
| 3,380,546 | 4/1968 | Rabjohn | 180/19 R X |

Primary Examiner—Evon C. Blunk
Assistant Examiner—Bruce H. Stoner, Jr.
Attorney—Joseph G. Werner et al.

[57] ABSTRACT

A trailer drive wheel assembly for close quarter maneuvering of the trailer on which it is mounted. The assembly has an electric motor powered by a battery connected to the motor by a reversible switch. The motor is connected by drive means to a maneuvering wheel which can be raised and lowered between a traveling position and a working position by a retractable mounting means that is mounted on the underside of the trailer.

3 Claims, 3 Drawing Figures

PATENTED DEC 18 1973 3,779,328

3,779,328

TRAILER MANEUVERING MECHANISM

BACKGROUND OF THE INVENTION

1. Field of the Invention

This invention pertains to means for maneuvering and propelling trailers in close quarters when there is not sufficient room for a towing vehicle to be attached to the trailer.

2. Description of the Prior Art

It is well known that trailers which are pulled by a drawbar or tongue are difficult to manuever in close quarters, especially when backing the towing vehicle. Oftentimes there is not sufficient room to maneuver the trailer with the towing vehicle and the trailer must be disconnected from the vehicle in order to push or pull the trailer to a parked position. It is extremely difficult to move very heavy trailers by the use of man power alone. What is needed is an independent power-driven system that can be easily engaged and disengaged and which will provide means to drive the trailer so that the operator only has to work the controls and steer the trailer, but does not have to push or pull the trailer himself.

SUMMARY OF THE INVENTION

Generally, my invention comprises a power-driven maneuvering wheel that can be retained in a raised traveling position when the trailer is being transported and lowered into a working position to supply a power drive when the trailer is disconnected from a towing vehicle and is to be maneuvered by hand.

An object of my invention is to provide an independent drive system for a trailer for close-quarter maneuvering. Another object of my invention is to provide a trailer-drive system that is mounted on the trailer and is integral therewith so that a separate drive system does not also have to be carried. A still further object of my invention is to provide a trailer-drive system that can be operated by one man who can both operate the trailer drive system controls and steer the trailer.

These and other objects of my invention, which will be apparent from the description and drawings, are accomplished by my trailer-drive system which has a maneuvering wheel powered by an electric motor. The system has a means for retracting the wheel to a raised traveling position or extending it to a lowered working position. When extended down into the lower working position, the wheel is in contact with the surface on which the trailer rests and, by means of the reversible motor, is driven so that the motor and maneuvering wheel provide a power-drive system for moving the trailer in either a forward or reverse direction. The switch for controlling the motor in either the forward or reverse direction is located near the drawbar or tongue of the trailer so that the operator who is steering the trailer by means of the drawbar can also control the power drive.

DESCRIPTION OF THE PREFERRED EMBODIMENT

Figure 1:
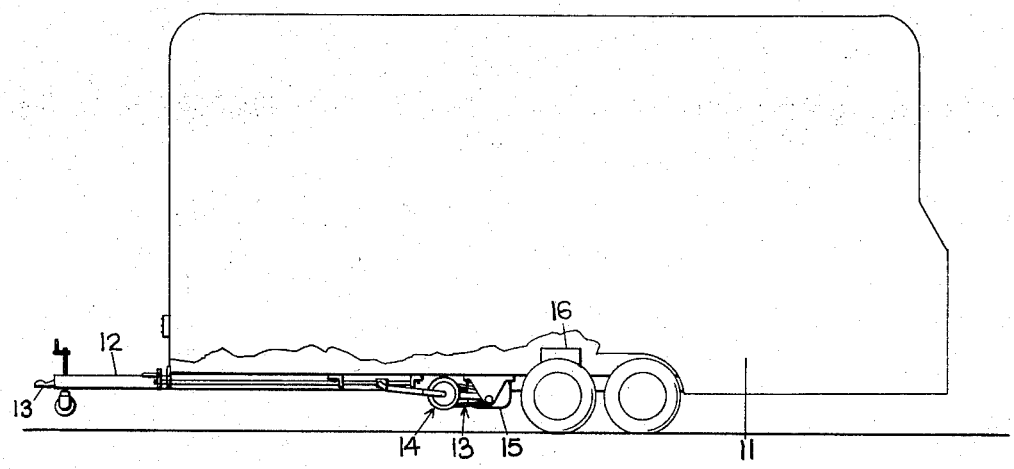
FIG. 1 is a side view of a trailer van with the side of the trailer partially cut away to show how my trailer drive system is mounted and shows the maneuvering wheel and drawbar support in its retracted position.

Referring now more particularly to the drawings, a trailer 11 having a drawbar 12 extending therefrom with a trailer hitch 13 at the end of the drawbar is shown. Running wheels located beneath the trailer and remote from the drawbar 12 provide mobile support means for the trailer. My retractable trailer-drive system is shown mounted on the underside of the trailer generally as 13. It consists generally of a retractable maneuvering wheel 14 which is driven by a reversible electric motor 15 that in turn is powered by an electric source 16. The maneuvering wheel 14 is positioned adjacently in front of the running wheels near the preferred center of gravity for a two-wheel or tandem-wheel trailer. A three position switch 17 is mounted to the trailer in the vicinity of the drawbar or on the drawbar and connects the motor and electric source by wiring, well known to those skilled in the art, and which is generally shown as 18.

The electric power source 16 that is shown is preferably an electric storage battery so that the trailer drive system is completely integral with the trailer and independent from any outside source of energy. However it is recognized that an external power source could be used. For instance, by means of long extension cords, the system could be connected to an external AC circuit and by means of A/C-D/C transformers drive the motor 15. As another alternative, similarly by using long extension cords, the motor could be driven off of a D/C power supplied by the vehicle which towed the trailer to the place where it is to be parked.

Electric motor 15 is preferably a reversible motor so that it can be run in either a forward or a reverse direction and thereby the trailer can be moved in either a forward or a reverse direction by means of the drive system. In the preferred embodiment the motor used is a gear motor in order to reduce the rotating speed of the means driving the maneuvering wheel. It has been found that a gear motor having a worm and gear arrangement to accomplish the reduction is preferable, but the gear reduction could also be accomplished by a gear to gear arrangement and any other suitable reduction means that are well known by those skilled in the art. The switch 17 has forward, off and reverse positions and as shown is located on the front end of the trailer. The operator can therefore control the direction of the trailer by the drawbar and at the same time have the switch control at his fingertips in order to either stop the trailer-drive system or reverse its direction. For trailers with a longer drawbar so that an operator standing near the hitch end of the trailer would be too far away from the switch, the switch 17 can be located on the drawbar at a convenient distance from the hitch end of the bar.

Figure 3:
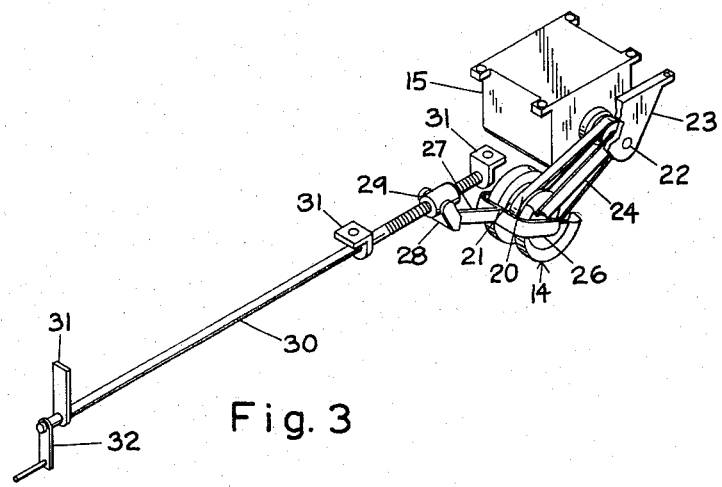
FIG. 3 is an isometric view of a portion of my trailer-drive system.

The maneuvering wheel 14 can consist of more than one wheel as shown in FIG. 3 where there are two wheels, but it has been found that one wheel will perform satisfactorily. The maneuvering wheel 14 is connected to the motor 15 by a drive means generally shown as 19. I prefer to use a gear chain arrangement since a chain with removable links can easily be replaced, lengthened or shortened without having to remove any other parts from the driving system. As shown, a chain 20 is axially connected to the wheel 14 by a sprockt 21. Similarly the chain is axially connected to the motor 15 by another sprocket mounted on the axle 22 of the motor 15. By varying the sizes of the sprocket 21 connected to the axle of a wheel 14 and the sprocket connected to the axle 22 of the motor 15 further gear reduction can be accomplished if necessary. For additional rigidity, a bracket 23 supports the axle 22 connecting the motor sprocket to the drive motor. This bracket 23 may not be necessary depending on the size of the axle 22 and the twisting torque pressure that may be developed between the motor and the maneuvering wheel. A bracket 24 axially engages and holds the maneuvering wheel 14 in spaced relationship with the motor axle 22 so that the proper tension can be maintained in the drive means 19.

Figure 2:
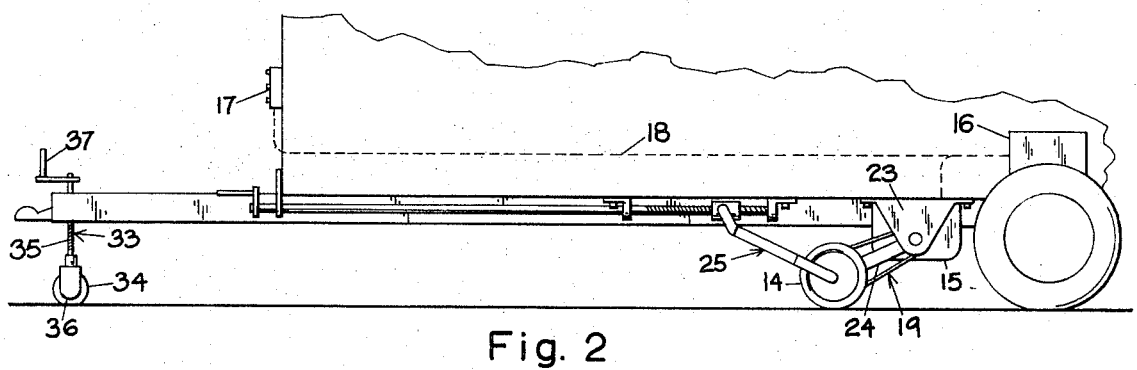
FIG. 2 is an enlarged side view with the trailer substantially cut away and showing the maneuvering wheel and drawbar support both in their lowered working positions.

Generally shown at 25 is a retractable mounting means for raising and lowering the maneuvering wheel 14 between the raised traveling position, in which it is shown in FIG. 1, and its lowered working position, in which it is shown in FIG. 2. This retractable mounting means includes the previously described bracket 24, which provides a first suspension arm for the maneuvering wheel. The rearward end of the bracket 24 is pivotally engaged at a fixed location on the underside of the trailer, which location is preferably provided by the motor axle 22, as illustrated in the drawings. In addition, the mounting means includes a U-shaped bracket 26 axially engaged with the maneuvering wheel 14, a U-shaped bracket 28 which is pivotally connected to a threaded cylinder 29, and a bar 27 which connects the U-shaped brackets 26 and 28. The bracket 26, bar 27 and bracket 28 together comprise a second suspension arm for the maneuvering wheel 14. The ends of said first and second suspension arms which are respectively connected to the motor axis 22 and the cylinder 29 will sometimes be referred to herein as the separated ends of the arms.

The threaded cylinder 29 comprises a transfer member for applying a linear force to the retractable mounting means to force the maneuvering wheel 14 up or down as required. An extension means 30 is mounted to the trailer 11 and connects to the cylinder transfer member 29 of the retractable mounting means 25 for raising and lowering mounting means 25. As shown in the drawings the preferred extension means 30 is a continuous screw or worm, the threaded end of which extends through the threaded cylinder 29. This screw is connected to the trailer and supported by the brackets shown as 31 in the drawing. When the worm 30 is turned by means of the crank 32 the threaded cylinder transfer member 29 will be moved longitudinally along the threaded portion of the worm. This will force the separated end of the second suspension arm 26, 27 and 28, which is connected to the transfer member 29, toward or away from the separated end of the first suspension arm 24, which is pivotally engaged at the fixed location of the motor axle 22. As the separated end of the second suspension arm is forced toward the separated end of the first suspension arm 24 by the transfer member 29, the ends of the suspension arms which are axially engaged with the maneuvering wheel 14 will force the maneuvering wheel 14 downwardly into driving engagement with the ground or other trailer supporting surface, as shown in FIG. 2. As the separated ends of the suspension arms are forced apart by the transfer member 29, the maneuvering wheel 14 will be raised to its traveling position shown in FIG. 1. Other alternatives to a worm could be used for the extension means 30, such as a sliding bar to which the transfer member 29 would be fixedly connected. By sliding the bar and transfer member forward or aft the retractable mounting means would be raised or lowered respectively.

A pivotal support 33 is shown mounted on the hitch end of the drawbar 12. The support 33 has a wheel 34 mounted to a substantially vertical rod 35 by means of a bracket 36 axially connected to the wheel 34. The rod 35 extends through the drawbar 12 and a crank or steering wheel 37 is mounted on the upper end of the rod 35 so that the wheel 34 can be turned by the operator. Thus the operator can use the pivotal support 33 to steer the trailer while propelling it by means of my trailer-drive system. This pivotal support 33 can be raised to a traveling position such as is shown in FIG. 1 and lowered to a working position as shown in FIG. 2. This can be accomplished in a number of ways. For example, the rod 35 could be a worm or screw that is raised and lowered by turning it with the crank or wheel 37. When it is lowered into the working position it could be lowered far enough so that the slight turning that is done when using the wheel 34 to steer the trailer would not be enough to raise the wheel above the level of contact with the ground. As an alternative the rod 35 could have apertures through it, and when the support is raised to its traveling position, as shown in FIG. 1, a pin could be placed through the aperture above the tongue so that the rod could not drop to its lowered position. When it is desired to move the support to its working position, as shown in FIG. 2, the pin is removed, the wheel lowered, and then the pin placed through the aperture at the underside of the drawbar 12 so that the rod 35 could not be raised away from its lowered working position. The pin acts as a stopper in either direction, as desired.

It is understood that this invention is not confined to the particular construction, arrangement of parts, and materials herein illustrated and described for exemplification of the principles of the invention, but embraces all such modified forms thereof as come within the scope of the following claims.

I claim:

1. A retractable trailer-drive system for close-quarter maneuvering in combination with a trailer having a drawbar at its front end and running wheels remote from the drawbar, said trailer drive system comprising:
   a. a reversible electric motor mounted on the underside of said trailer,
   b. means for providing a source of electric current to said motor,
   c. a maneuvering wheel supported beneath the underside of said trailer at a position remote from the drawbar and spaced adjacently in front of the running wheels,
   d. means connecting said maneuvering wheel to said motor for driving said maneuvering wheel,
   e. retractable mounting means secured to the underside of said trailer for raising and lowering said maneuvering wheel between a raised traveling position and a lowered working position, said mounting means having first and second suspension arms each having one end thereof axially engaged with said maneuvering wheel, said first suspension arm having a separated end pivotally engaged on the underside of said trailer, and said second suspension arm having a separated end pivotally engaged with a transfer member movably mounted on the underside of said trailer, f. extension means mounted to said trailer for engaging and moving said transfer member toward said first suspension arm separated end to force the ends of said suspension arms engaged with said maneuvering wheel downwardly, and for moving said transfer member away from said first suspension arm sparated end to lift the suspension arm ends engaged with said maneuvering wheel upwardly, and g. a pivotal support depending from said drawbar for supporting and steering the front end of said trailer.

2. The trailer-drive system of claim 1 wherein said means for providing a source of electric current to said motor comprises a battery mounted on said trailer and a switch connecting said motor and said battery.

3. The trailer-drive system in claim 1 wherein the extension means for moving the transfer member is a continuous screw mounted for rotation on the underside of the trailer, said screw having a crank and a portion threadedly engaged with the transfer member to move said transfer member longitudinally on said screw when said screw is rotated.

* * * * *